United States Patent
Imada et al.

(10) Patent No.: US 9,580,110 B2
(45) Date of Patent: Feb. 28, 2017

(54) VEHICLE BODY SKELETON STRUCTURE

(71) Applicant: Fuji Jukogyo Kabushiki Kaisha, Tokyo (JP)

(72) Inventors: Haruyuki Imada, Tokyo (JP); Akira Nakajima, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/859,720

(22) Filed: Sep. 21, 2015

(65) Prior Publication Data
US 2016/0083016 A1  Mar. 24, 2016

(30) Foreign Application Priority Data
Sep. 24, 2014 (JP) ................ 2014-194259

(51) Int. Cl.
| | | |
|---|---|---|
| B62D 25/04 | (2006.01) | |
| B62D 21/15 | (2006.01) | |
| B62D 25/00 | (2006.01) | |
| B62D 27/02 | (2006.01) | |

(52) U.S. Cl.
CPC ........... *B62D 21/157* (2013.01); *B62D 25/00* (2013.01); *B62D 25/04* (2013.01); *B62D 27/023* (2013.01)

(58) Field of Classification Search
CPC ...... B62D 21/157; B62D 25/00; B62D 25/04; B62D 25/023; B62D 27/023
USPC ............ 296/205, 29, 30, 193.06, 183.2, 178
See application file for complete search history.

(56) References Cited

U.S. PATENT DOCUMENTS

| | | | | |
|---|---|---|---|---|
| 1,801,869 A | * | 4/1931 | Ledwinka | B62D 25/00 296/193.06 |
| 2,007,255 A | * | 7/1935 | Gustav | B62D 27/023 296/193.06 |
| 2,197,644 A | * | 4/1940 | Krogh | B62D 25/04 296/193.06 |
| 2,490,532 A | * | 12/1949 | Maxon, Jr. | B60P 1/20 296/183.2 |
| 4,660,345 A | * | 4/1987 | Browning | B62D 21/08 164/63 |
| 5,096,254 A | * | 3/1992 | Sparke | B62D 25/04 296/193.06 |
| 6,520,590 B2 | * | 2/2003 | Feuereisen Azocar | B60P 1/286 296/183.2 |
| 7,500,802 B2 | * | 3/2009 | Patberg | B62D 23/005 180/311 |
| 8,235,458 B2 | * | 8/2012 | Mori | B62D 21/157 296/193.06 |

(Continued)

FOREIGN PATENT DOCUMENTS

| | | |
|---|---|---|
| JP | 2010-173562 A | 8/2010 |
| JP | 2011-088484 A | 5/2011 |

(Continued)

OTHER PUBLICATIONS

Japanese Office Action mailed Jun. 14, 2016 issued in corresponding Japanese Patent Application No. 2014-194259.

*Primary Examiner* — Dennis H Pedder
(74) *Attorney, Agent, or Firm* — Troutman Sanders LLP (57) ABSTRACT

A vehicle body skeleton structure includes: a skeleton member bent to have a predetermined shape; and at least one reinforcement member welded to the skeleton member along a plurality of weld lines to be joined to a surface of the skeleton member, and bent along the surface.

5 Claims, 6 Drawing Sheets

(56) References Cited

U.S. PATENT DOCUMENTS

| | | | |
|---|---|---|---|
| 8,608,233 B2* | 12/2013 | Mori | B62D 25/04 |
| | | | 296/187.12 |
| 2001/0050497 A1* | 12/2001 | Jaekel | B62D 23/005 |
| | | | 296/205 |
| 2011/0241384 A1* | 10/2011 | Mori | B62D 25/04 |
| | | | 296/193.06 |
| 2011/0298245 A1* | 12/2011 | Jarocki | B62D 21/03 |
| | | | 296/193.07 |
| 2011/0304175 A1* | 12/2011 | Mori | B62D 21/157 |
| | | | 296/193.06 |
| 2014/0145469 A1* | 5/2014 | Mildner | B62D 29/005 |
| | | | 296/193.06 |

FOREIGN PATENT DOCUMENTS

| | | |
|---|---|---|
| JP | 2013-018369 A | 1/2013 |
| JP | 2013-107558 A | 6/2013 |
| WO | 2014-017961 A1 | 1/2014 |

* cited by examiner

VEHICLE BODY SKELETON STRUCTURE

CROSS-REFERENCE TO RELATED APPLICATION

The present application claims priority from Japanese Patent Application No. 2014-194259 filed on Sep. 24, 2014, the entire contents of which are hereby incorporated by reference.

BACKGROUND

The technology relates to a vehicle body skeleton structure in which a skeleton member and a reinforcement member are joined together to thereby control a deformation mode upon receiving of external force.

In general, a skeleton or a "body skeleton" that structures a body of a vehicle such as, but not limited to, an automobile is formed through bending of steel plates into desired shapes with use of a press forming machine, etc. To fulfill predetermined rigidity necessary for the body, a reinforcement steel plate, or a so-called "reinforcement", is joined to a region having insufficient strength in the body skeleton to reinforce the body skeleton. A joining method used to join the reinforcement steel plate may be, for example but not limited to, spot welding. The reinforcement steel plate is welded on as-needed basis in accordance with a strength required for each of a front pillar, a side rail, a center pillar, a side sill, etc., that may be non-limiting examples of such a body skeleton.

A widely-employed body skeleton has a configuration in which an outer panel and an inner panel serving as two skeleton members are joined together to form a closed cross-section, and in which the reinforcement steel plate is provided therebetween inside the space formed by the closed cross-section. The skeleton members are formed individually in advance through press forming, etc., and are joined together sequentially through a method such as, but not limited to, spot welding with those skeleton members being temporarily held at their respective predetermined positions during assembling.

For example, among the body skeletons, the center pillar is required to achieve a structure by which an upper part of the body is reinforced to have high strength such that deformation is minimized to protect occupants upon application of external force from the side due to side collision, etc., whereas a lower part of the body is reinforced such that the deformation is maximized to absorb impact energy upon the application of the external force.

Japanese Unexamined Patent Application Publication (JP-A) No. 2010-173562 discloses a technique that allows for deformation of a vehicle body skeleton, based on deformation modes that are different for respective regions in the single body skeleton, for example. In JP-A No. 2010-173562, a reinforcement steel plate joined to an outer panel of a center pillar has a lower vertical wall provided on the lower side of the reinforcement steel plate and so slanted widely as to extend inwardly in a vehicle width direction, and an upper vertical wall provided on the upper side of the reinforcement steel plate and not so slanted as compared with the lower vertical wall. Upon application of external force from the side, the lower vertical wall is so deformed and crushed as to be inclined toward a vehicle interior to absorb impact energy. Because the upper vertical wall is not so slanted as compared with the lower vertical wall, the upper vertical wall exerts resistive force against the external force upon the application of the external force from the side to prevent occurrence of large deformation toward the vehicle interior.

SUMMARY

The technique disclosed in JP-A No. 2010-173562 utilizes a shape of the reinforcement steel plate to control the deformation modes upon receiving of the external force, meaning that a cross-sectional shape of the outer panel of the center pillar is not coincident with a cross-sectional shape of the reinforcement steel plate. This makes it necessary to temporarily hold the reinforcement steel plate, with flanges formed on both sides of the reinforcement steel plate being interposed between flanges formed on the respective outer panel and inner panel, to perform welding. It is therefore disadvantageous in that not only the welding work is complex but also the smooth welding work is difficult for a region where it is difficult to bring a welding gun used in spot welding, etc., to a portion to be welded.

To address such disadvantages, JP-A No. 2011-88484 discloses a technique in which a reinforcement steel plate is brazed to a portion to be reinforced of a plate-shaped outer panel that is before being subjected to press forming, following which the outer panel and the reinforcement steel plate are bent together by the press forming, for example.

The technique disclosed in JP-A No. 2011-88484 allows for brazing of the reinforcement steel plate in a state in which the reinforcement steel plate is in a shape of flat plate, before performing the press forming. Hence, it is possible to eliminate the welding work following the press forming, and thereby to improve work efficiency.

However, the outer panel and the reinforcement steel plate are subjected to the press forming together with the reinforcement steel plate being joined to the outer panel in the technique disclosed in JP-A No. 2011-88484. Hence, in order to cause a single outer panel to be deformed based on the different deformation modes with use of the reinforcement steel plate, it is necessary to so attach a plurality of such reinforcement steel plates in an intricate fashion as to allow desired deformation modes to be achieved before performing the press forming. It is therefore disadvantageous in that the number of setup processes before the press forming is increased. It is also disadvantageous in that, because the reinforcement steel plates have to be arranged at their respective predetermined positions, characteristics of each of the deformation modes are not changeable easily and versatility is thus low.

It is desirable to provide a vehicle body skeleton structure that makes it possible to set different deformation modes easily and achieve high versatility.

An aspect of the technology provides a vehicle body skeleton structure that includes: a skeleton member bent to have a predetermined shape; and at least one reinforcement member welded to the skeleton member along a plurality of weld lines to be joined to a surface of the skeleton member, and bent along the surface.

DETAILED DESCRIPTION

Figure 1:
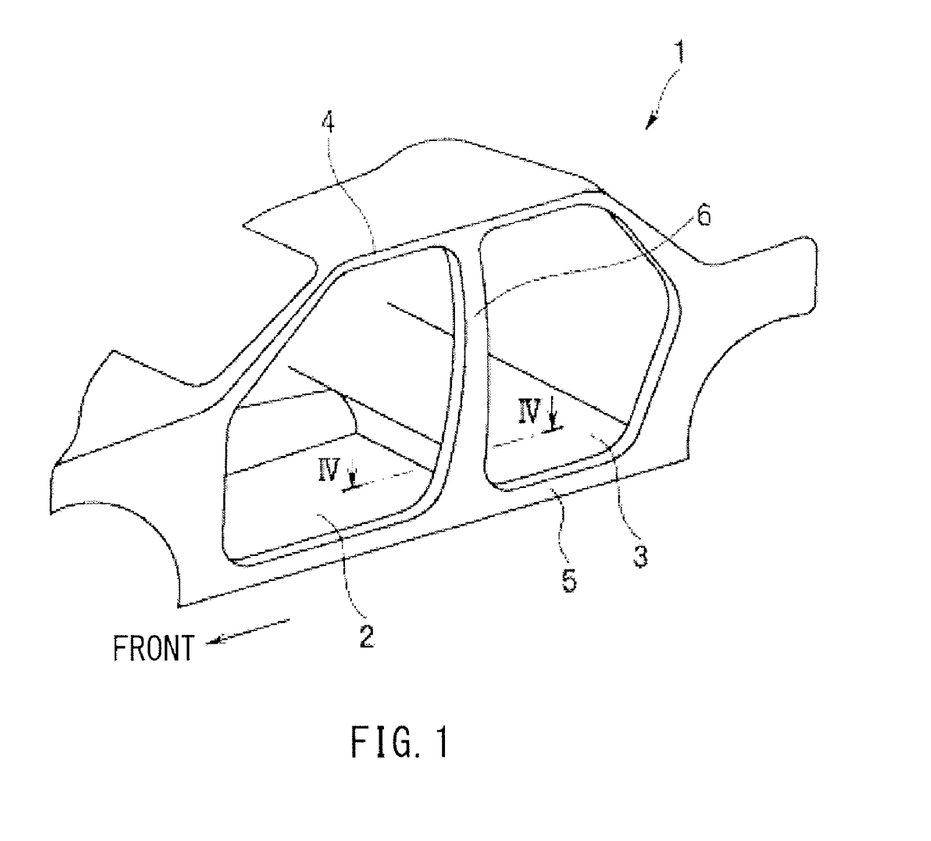
FIG. 1 is a schematic perspective view of a left side part of a body.

In the following, some implementations of the technology are described in detail with reference to the drawings. FIG. 1 illustrates a left side part of a body 1 of a vehicle. Note that, because the left side part and a right side part of the body 1 are bilaterally symmetric in shape, description is given only for the left side part and is omitted for the right side part.

Each of the left and right side parts of the vehicle 1 has a front door opening 2 for attaching a front door and a rear door opening 3 for attaching a rear door. An upper part of each of the front door opening 2 and the rear door opening 3 is disposed with a side rail 4, whereas a lower part of each of the front door opening 2 and the rear door opening 3 is disposed with a side sill 5. Between the front door opening 2 and the rear door opening 3 is a center pillar 6 having an upper end coupled to the side rail 4 and a lower end coupled to the side sill 5 and structuring a body skeleton of the vehicle 1.

Figure 2:
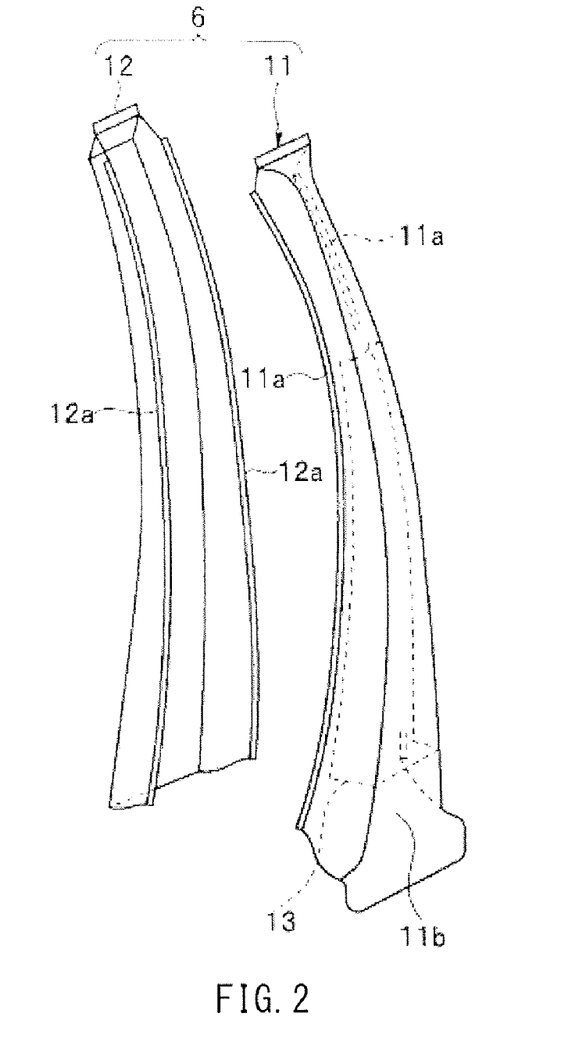
FIG. 2 is an exploded perspective view of a center pillar.
Figure 4:
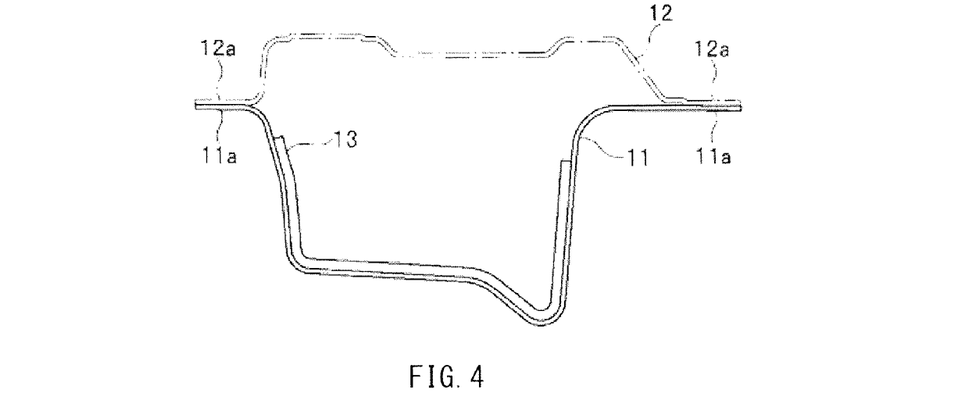
FIG. 4 is a cross-sectional view taken along a line IV-IV in FIG. 1.

Referring to FIG. 2, the center pillar 6 includes an outer panel 11 and an inner panel 12 each serving as a skeleton member. A reinforcement 13 serving as a reinforcement member is joined to an inner surface of the outer panel 11. The outer panel 11 may be formed to have a substantially hat-like cross-sectional shape, and the inner panel 12 may be formed to have a substantially hat-like cross-sectional shape that is shallower than the cross-sectional shape of the outer panel 11 as illustrated in FIG. 4. Both sides of the outer panel 11 and the inner panel 12 may be formed with respective flanges 11a and 12a that are joined to each other, allowing the center pillar 6 to have a bulged structure, or a clamshell structure, having a closed cross section.

An upper part of the center pillar 6 may be formed to have a width narrower than a width of a lower part of the center pillar 6, and may be curved inwardly toward a vehicle interior. The reinforcement 13 may be formed to have a substantially U-shaped cross-section, and joined along the inner surface of the outer panel 11 in a region extending from a part in the vicinity of the lower part to a part in the vicinity of the upper part of the outer panel 11. The outer panel 11 and the inner panel 12 each may be formed through bending (i.e., press forming) of a steel plate processed to have a predetermined size. The outer panel 11 and the reinforcement 13 may have a so-called patch work structure in which the outer panel 11 and the reinforcement 13 are joined while they are each in a form of a steel plate (a plate member) before being subjected to the press forming. The reinforcement 13 may thus have a shape that follows along the inner surface of the outer panel 11.

Figure 5:
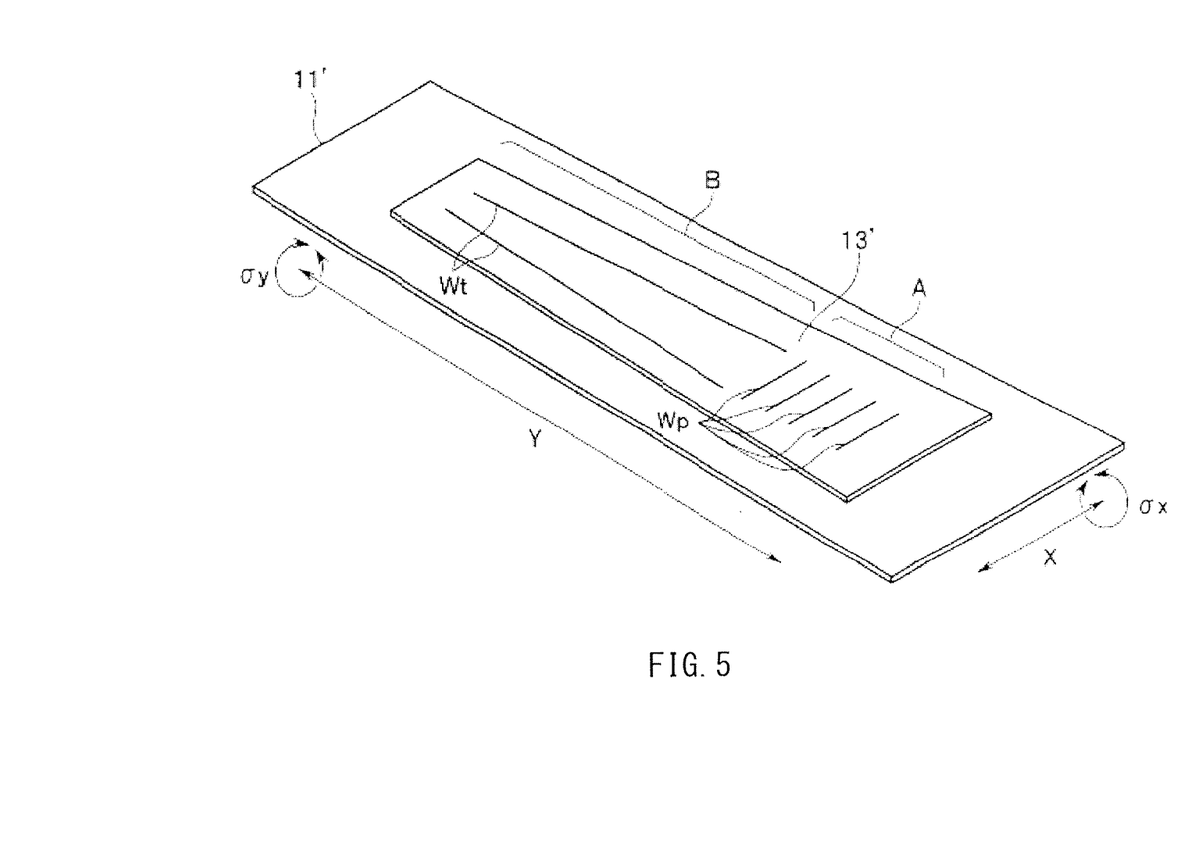
FIG. 5 is a perspective view illustrating a state in which the plate-shaped reinforcement is joined to the plate-shaped outer panel.

More specifically, as illustrated in FIG. 5, a patch steel plate 13' serving as the reinforcement member may be fixed, with the patch steel plate 13' being positioned at a predetermined location, to an inner surface of a panel steel plate 11' serving as the skeleton member. The panel steel plate 11' may be processed in advance into a predetermined shape having a predetermined size (in an illustrated example, a shape in which a side on an upper part of the panel steel plate 11' is removed), and eventually serves as the outer panel 11. The patch steel plate 13' may be processed in advance into a predetermined shape having a predetermined size (in the illustrated example, a shape in which a side on an upper part of the patch steel plate 13' is removed), and eventually serves as the reinforcement 13.

The patch steel plate 13' serving eventually as the reinforcement 13 may include a lower region A and a middle-to-upper region B. The lower region A may have a plurality of lateral weld lines Wp (five lines in the illustrated example without limitation) set to extend in a horizontal direction at predetermined intervals. The middle-to-upper region B may extend from a part, slightly above a lower part of the patch steel plate 13', to an upper part of the patch steel plate 13', and may have a plurality of vertical weld lines Wt (two lines in the drawing without limitation) set to extend in a direction substantially perpendicular to the horizontal direction at predetermined intervals. A width in an X direction of both the lateral weld lines Wp and the vertical weld lines Wt may be so set as to be within an outer side surface 11b, facing toward the outside of the body 1, of the outer panel 11 and as to be within a plane in a longitudinal direction of a vehicle. The lower region A may be a non-limiting example of a first region, and the middle-to-upper region B may be a non-limiting example of a second region.

The outer panel 11 and the reinforcement 13 are welded along the lateral weld lines Wp and the vertical weld lines Wt, with use of any welding method such as, but not limited to, spot welding, laser welding, or friction stir welding (FSW). In one implementation where the spot welding is used, welding point lines are set at predetermined weld pitches along the respective lateral and vertical weld lines Wp and Wt. In one implementation where the laser welding or the friction stir welding is used, a bead is continuously formed along each of the lateral and vertical weld lines Wp and Wt.

As a result of the welding, a portion on each of the lateral and vertical weld lines Wp and Wt is cured. This achieves deformation resisting characteristics which are strong with respect to bending stress applied along a bending axis that is oriented in a direction substantially orthogonal to the lateral weld lines Wp or the vertical weld lines Wt, and weak with respect to bending stress applied along a bending axis that is oriented in a direction along the lateral weld lines Wp or the vertical weld lines Wt.

Hence, as illustrated in FIG. 5, the deformation resisting characteristics are achieved in the lower region A which are weak with respect to bending stress σx applied along the bending axis oriented in the X direction (the horizontal direction substantially), and strong with respect to bending stress σy applied along the bending axis oriented in a Y direction (the vertical direction substantially). In the middle-to-upper region B, the deformation resisting characteristics are achieved which are strong with respect to the bending stress σx applied along the bending axis oriented in the X direction (the horizontal direction substantially), and weak with respect to the bending stress σy applied along the bending axis oriented in the Y direction (the vertical direction substantially).

Figure 6:
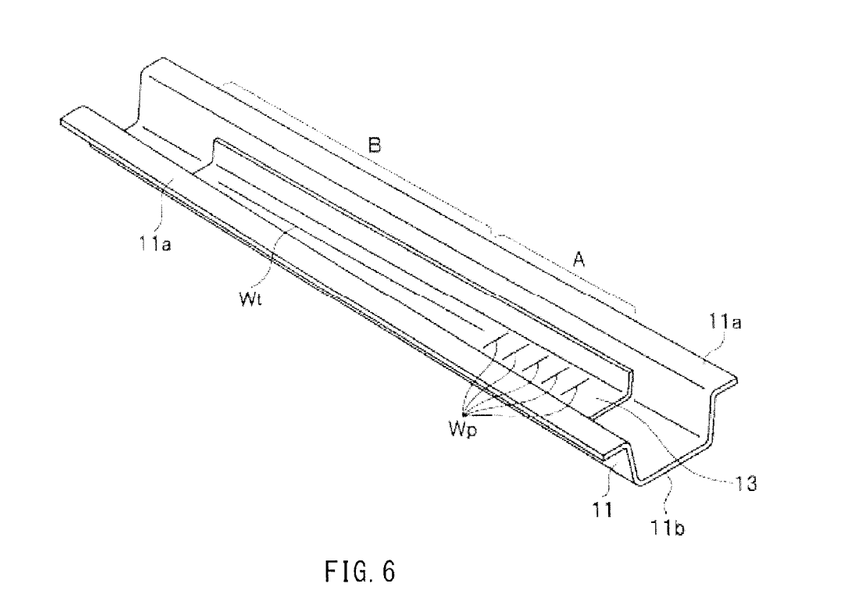
FIG. 6 is a perspective view illustrating a state following press forming of the members illustrated in FIG. 5.
Figure 7A:
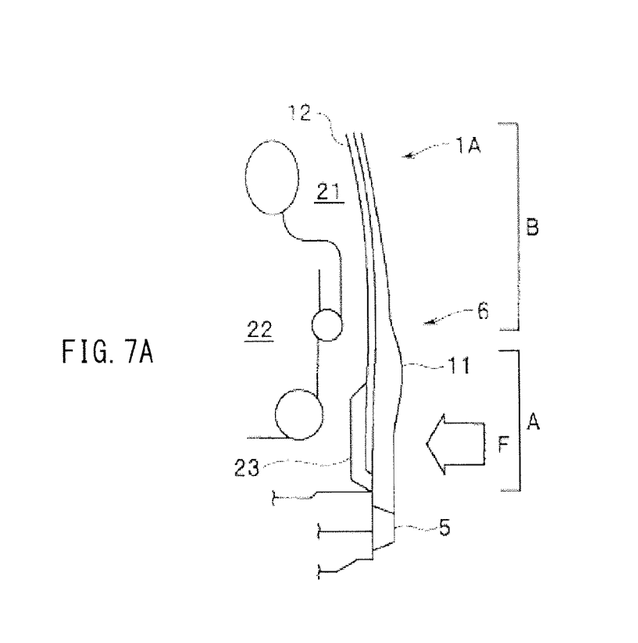
FIG. 7A schematically illustrates a state before an impact load is applied to the center pillar.

Consequently, performing the press forming of such mutually-joined panel steel plate 11' and patch steel plate 13' together to form the outer panel 11 and the reinforcement 13 simultaneously as illustrated in FIG. 6 allows deformation modes to act in different directions, in the single outer panel 11, for the respective lower region A and middle-to-upper region B. Referring to FIG. 7A, the lower region A may be set corresponding to a height of an unillustrated seat cushion of a front seat provided in the vehicle interior 21 of the vehicle 1A and a height around the waist of an occupant 22 seated on the seat cushion.

Figure 3:
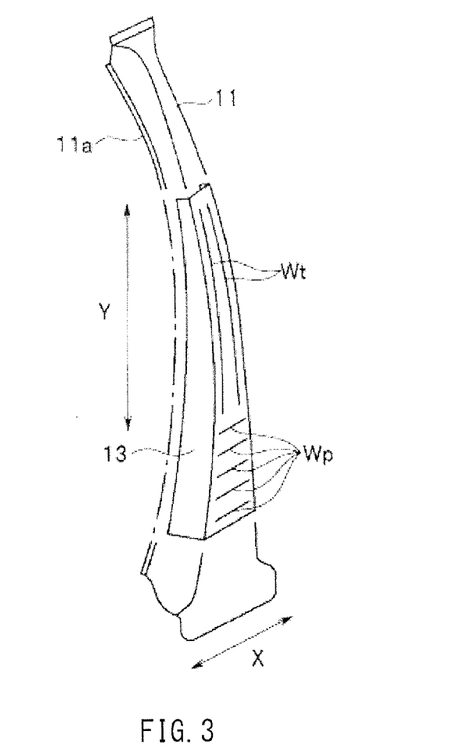
FIG. 3 is a partially-transparent perspective view of a reinforcement welded to an outer panel that structures the center pillar, where a region of the center pillar corresponding to the reinforcement is drawn transparent to illustrate the welded reinforcement.

A description is given next of an operation of the implementation having the foregoing example configuration. In the vehicle 1A having the structure of the body 1 as illustrated in FIG. 7A, the outer panel 11 and the reinforcement 13 joined to the inner surface of the outer panel 11 are welded together along the plurality of lateral weld lines Wp in the lower region A of the center pillar 6, whereas the outer panel 11 and the reinforcement 13 are welded together along the plurality of vertical weld lines Wt in the middle-to-upper region B of the center pillar 6, as illustrated in FIG. 3. The portion on each of the lateral and vertical weld lines Wp and Wt is cured, achieving the deformation resisting characteristics in the region A which are weak with respect to the bending stress σx applied along the bending axis oriented in the X direction (the horizontal direction substantially), and strong with respect to the bending stress σy applied along the bending axis oriented in the Y direction (the vertical direction substantially). The deformation resisting characteristics are achieved in the middle-to-upper region B which are strong with respect to the bending stress σx applied along the bending axis oriented in the X direction.

Figure 7B:
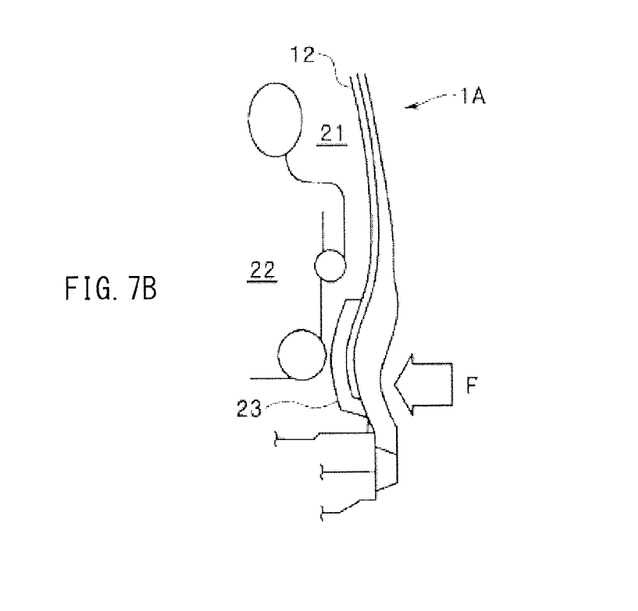
FIG. 7B schematically illustrates a state in which the impact load is applied to the center pillar and a lower region and a middle-to-upper region are deformed based on respective deformation modes different from each other.

As a result, when impact load F is applied onto a side face of the vehicle 1A in a direction from the side toward the vehicle interior 21 due to, such as but not limited to, the side collision, the deformation mode which allows for bending along the bending axis oriented in the X direction as illustrated in FIG. 3 is generated in the lower region A of the side pillar 6, thereby absorbing impact energy. Such generation of the deformation mode also causes the lower region A to protrude toward the vehicle interior 21, making a waist pushing pad 23 attached to the inner panel 12 push the seat cushion of the front seat and the waist of the occupant 22 seated on the front seat and thus pressing the front seat and the occupant 22 toward the middle of the vehicle interior 21 to evacuate the occupant 22.

The middle-to-upper region B of the center pillar 6 has the deformation resisting characteristics strong with respect to the bending stress σx applied along the bending axis oriented in the X direction (the horizontal direction substantially), making it difficult to cause deformation toward the vehicle interior 21 and thus making it possible to effectively protect the head of the occupant 22.

In the foregoing implementation, the outer panel 11 structuring the center pillar 6 and the reinforcement 13 joined to the inner surface of the outer panel 11 have the patch work structure, and the press forming is performed with the patch steel plate 13' being joined in advance to the panel steel plate 11' that is before being subjected to the press forming. Hence, it is possible to eliminate an occasion in which a welding gun or the like is blocked from reaching a portion to be welded and to accurately set a weld position, as compared with a case in which the panel steel plate 11' and the patch steel plate 13' are individually joined after the press forming.

Also, the plurality of lateral and vertical weld lines Wp and Wt are set to the mutually-superimposed patch steel plate 13' and panel steel plate 11', and the welding is performed along the lateral and vertical weld lines Wp and Wt to cure the portion on each of the lateral and vertical weld lines Wp and Wt. This makes it possible to set deformation resisting strength to any level in a region in which the reinforcement 13 is joined to the outer panel 11 following the press forming. As a result, it is possible to eliminate the necessity of combining reinforcement steel plates in an intricate fashion unlike before, and to set any deformation modes in different directions to respective regions (the lower region A and the middle-to-upper region B in the present implementation) easily.

Furthermore, the deformation modes in the different directions are achieved by the welding performed at the time of joining the reinforcement 13. Hence, it is possible to increase a degree of freedom in controlling behavior of the deformation, and to achieve both the occupant protection and optimization of absorption of the impact energy applied upon, for example but not limited to, the side collision. Moreover, it is not necessary to form a reinforcement rib at the time of the press forming, making it possible to simplify a forming die. Besides, it is possible to change the weld lines easily. Hence, it is possible to address a change in the characteristics of the deformation modes easily without the necessity of changing the forming die, and to achieve high versatility.

In implementations of the technology, the reinforcement as the reinforcement member is welded to the outer panel as the skeleton member along the plurality of weld lines. Thus, the welded portion on each of the weld lines is cured, making it possible to set the deformation modes easily. Hence, unlike before, it is possible to eliminate the necessity of combining reinforcement steel plates in an intricate fashion. Also, it is possible to address a change in the characteristics easily by changing factors such as, but not limited to, the number, the intervals, and the extending directions of the weld lines on an as-needed basis. Hence, it is possible to achieve high versatility.

Hence, it is possible to provide the vehicle body skeleton structure that makes it possible to set different deformation modes easily without combining reinforcement steel plates in an intricate fashion, and address a change in characteristics easily to achieve high versatility.

It is to be noted that the technology is by no means limited to the implementations described above. For example, in one implementation, the weld lines may be set obliquely, in a brace shape, or in a grid shape on the patch steel plate 13'. Also, in the above-described implementations, the lateral and vertical weld lines Wp and Wt that are different in directions from each other are set to the single patch steel plate 13'. However, in one implementation, the weld lines may be set individually to each of the two or more patch steel plates. Furthermore, in one implementation, two or more patch steel plates may be superimposed on one another.

The body skeleton to which any implementation of the technology is applicable is not limited to the center pillar 6. An implementation of the technology is applicable to any body skeleton that structures a body. Non-limiting examples of such a body skeleton may include a front pillar, a rear pillar, a side rail, and a side sill. Further, one or more patch steel plates may be joined to an outer surface of the skeleton member.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle body skeleton structure, comprising:
    a vehicle pillar bent to have a predetermined shape, and
    at least one internal reinforcement member welded to the vehicle pillar, bent along a surface of the vehicle pillar and having a portion opposite to the surface of the vehicle pillar over the portion entirely, the portion including:
        a first region with a plurality of first continuous weld lines substantially parallel to each other at predetermined intervals and extending in a vertical direction, and
        a second region with a plurality of second continuous weld lines substantially parallel to each other at predetermined intervals and extending in a horizontal direction,
    wherein the second region is separate from the first region, and
    wherein the reinforcement member is welded to the vehicle pillar along the first weld lines and the second weld lines.

2. The vehicle body skeleton structure according to claim 1, wherein the at least one reinforcement member is a single reinforcement member joined to the vehicle pillar and including the first region and the second region.

3. The vehicle body skeleton structure according to claim 1, where the line at least one reinforcement member is welded along the weld lines to the vehicle pillar, while the vehicle pillar and the at least one reinforcement member are each in a form of a plate before being bent.

4. The vehicle body skeleton structure according to claim 2, wherein the single reinforcement member is welded along the weld lines to the vehicle pillar, while the vehicle pillar and the single reinforcement member are each in a form of a plate before being bent.

5. The vehicle body skeleton structure according to claim 1, where the vehicle pillar extends between and upper part and a lower part of a vehicle, and the vehicle pillar is positioned between a front door opening and a rear door opening of the vehicle.

* * * * *